United States Patent [19]

Nishi et al.

[11] Patent Number: 4,668,053

[45] Date of Patent: May 26, 1987

[54] COLLIMATOR LENS

[75] Inventors: Hisami Nishi; Minoru Toyama, both of Hyogo, Japan

[73] Assignee: Nippon Sheet Glass Co., Ltd., Osaka, Japan

[21] Appl. No.: 726,627

[22] Filed: Apr. 24, 1985

[51] Int. Cl.⁴ .............................. G02B 3/00; G02B 9/02
[52] U.S. Cl. ..................................................... 350/413
[58] Field of Search ......................................... 350/413

[56] References Cited

U.S. PATENT DOCUMENTS 3,859,103  1/1975  Yoshiyagawa et al. ............ 350/413

Primary Examiner—John K. Corbin
Assistant Examiner—Rebecca D. Gass
Attorney, Agent, or Firm—Woodcock, Washburn, Kurtz, Mackiewicz & Norris

[57] ABSTRACT

A collimator lens of graded index type for a semiconductor laser which can be manufactured at low cost and has the residual wavefront aberration equal to or less than that of a conventional collimator lens of spherical lens system is provided by comprising a rod lens of graded index type made of a cylindrical transparent medium having the refractive index n(r) at position of radial distance r from the central axis represented by;

$$n^2(r) = n_0^2 \{1 - (g \cdot r)^2 + h_4(g \cdot r)^4 + h_6(g \cdot r)^6 + h_8(g \cdot r)^8 + \ldots\}$$

and satisfying following conditions:

(1) $r_1 = \infty$;
(2) $r_2 = \infty$;
(3) $6.70 \text{ mm} \leq Z + f_B \leq 7.30 \text{ mm}$;
(4) $1.60 \leq n_0 \leq 1.65$;
(5) $0.18 \text{ mm}^{-1} \leq g \leq 0.22 \text{ mm}^{-1}$;
(6) $0.38 \leq h_4 \leq 0.87$;
(7) $|h_6| < 5$; and
(8) $0.21 \leq NA \leq 0.24$;

where $r_1$ and $r_2$ are curvature radii at the lens incidence surface and emission surface, respectively, Z is the lens length, $f_B$ is the back focus at the side of light source (object), NA is the numerical aperture at the side of the light source, $n_0$ is the refractive index on the central axis, g, $h_4$ and $h_6$ are distribution coefficients.

1 Claim, 2 Drawing Figures

COLLIMATOR LENS

BACKGROUND OF THE INVENTION

1. Field of the Invention

The present invention relates to a collimator lens of graded index type to collimate radiated rays from a semiconductor laser into parallel rays in a light beam scan apparatus such as an optical memory, an optical readout device and a laser beam printer.

2. Description of the Prior Art

In the collimator lens for the above-mentioned apparatuses, it is essential for collimation of radiated rays from a semiconductor laser at low aberration that the residual wavefront aberration of the lens is within $\lambda/4$, where $\lambda$ is the osillation wavelength of the semiconductor laser and generally in a range of 760 nm$\leq \lambda \leq$850 nm. Also the collimator lens should be in small size, light weight and low cost.

In such light beam scan apparatuses, a single wavelength is usually used. Consequently, if the transmittance of the lens is as high as possible, the light emission power of the laser can be correspondingly suppressed and the reliability of the apparatus be improved. It is favorable for the measures that an antireflection coating is applied to the lens surface and the number of lenses is made as small as possible.

As a collimator lens to satisfy the above-mentioned requirements, one constituted by combination of three or four usual spheric lenses each having the uniform refractive index is known. Since such a usual collimator lens has as many as six to eight machining surfaces for spherical polishing and the lens diameter is in general very small, however, the polishing is difficult and high technical skill is required for combination of lenses such as cementing process, resulting in high cost.

SUMMARY OF THE INVENTION

Accordingly, it is an object of the present invention to provide a collimator lens of graded index type for a semiconductor laser, in which the residual wavefront aberration is equal to or less than that of a conventional collimator lens of spherical lens system.

It is another object of the present invention to provide a collimator lens of graded index type for a semiconductor laser, in which polishing machining is quite easy and therefore mass production in low cost is possible.

According to the present invention, the above objects are attained by a collimator lens of graded index type for a semiconductor laser, comprising a rod lens of graded index type made of a cylindrical transparent medium having the refractive index $n(r)$ at position of radial distance $r$ from the central axis represented by $$n^2(r) = n_o^2\{1 - (g \cdot r)^2 + h_4(g \cdot r)^4 + h_6(g \cdot r)^6 + h_8(g \cdot r)^8 + \ldots\}$$

and satisfying following conditions:

(1) $r_1 = \infty$
(2) $r_2 = \infty$
(3) 6.70 mm $\leq Z + f_B \leq$ 7.30 mm
(4) 1.60 $\leq n_o \leq$ 1.65
(5) 0.18 mm$^{-1} \leq g \leq$ 0.22 mm$^{-1}$
(6) 0.38 $\leq h_4 \leq$ 0.87
(7) $|h_6| <$ 5
(8) 0.21 $\leq$ NA $\leq$ 0.24

In the above conditions (1) to (9), $r_1$ and $r_2$ are curvature radii at the lens incidence surface and emission surface, respectively, Z is the lens length, $f_B$ is the back focus at the side of light source (object), NA is the numerical aperture at the side of the light source, $n_o$ is the refractive index on the central axis, g, $h_4$ and $h_6$ are distribution coefficients.

Other and further objects, features and advantages of the invention will appear more fully from the following description.

DETAILED DESCRIPTION OF THE INVENTION

Figure 1:
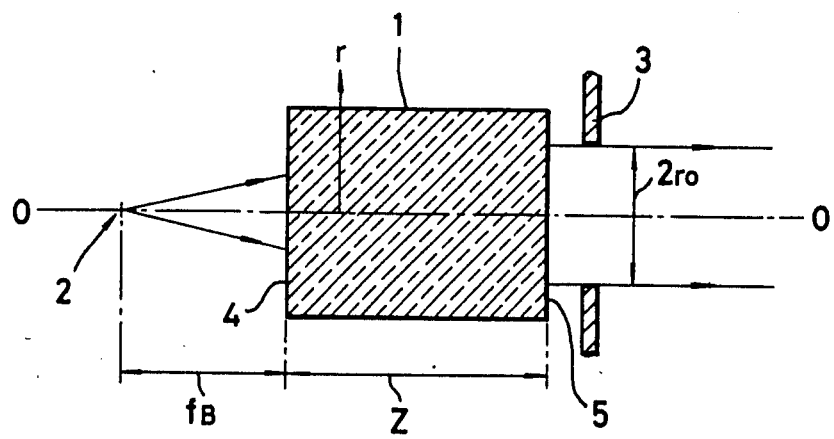
FIG. 1 is a sectional view showing function of a collimator lens of graded index type for a semiconductor laser according to a preferred embodiment of the invention.

Each condition of the present invention will now be described.

$$r_1 = \infty \tag{1}$$

$$r_2 = \infty \tag{2}$$

These conditions represent that the lens has the flat incidence end surface and emission end surface. Since the both surfaces of each lens of the invention are flat, plane polishing of a number of lenses can be performed simultaneously, thereby machining efficiency during the polishing can be significantly improved and the machining cost be largely reduced.

$$6.70 \text{ mm} \leq Z + f_B \leq 7.30 \text{ mm} \tag{3}$$

This condition determines the numerical aperture NA in the condition (9). If the range of the condition (3) is not satisfied, NA becomes too large or too small.

$$2r_0 \leq 2.0 \text{ mm}$$

This condition determines the effective aperture of the lens. In light beam scan apparatuses as above described, the effective aperture of 2 mm $\phi$ is usually required. Consequently, the outer diameter of the lens is selected more than 2 mm $\phi$.

$$1.60 \leq n_o \leq 1.65 \tag{4}$$

$$0.18 \text{ mm}^{-1} \leq g \leq 0.22 \text{ mm}^{-1} \tag{5}$$

These conditions determine the distribution of refractive index required to satisfy NA in the condition (8) and the effective aperture in the condition $2r_0 \geq 2.0$ mm and to obtain a definite back focus $f_B$, where $n_o$ represents the refractive index on the central optical axis, and g represents the gradient of refractive index and corresponds to the curvature radius in spherical surface of a usual lens. If g is too large, $f_B$ becomes too short; if the former is too small, NA becomes too small.

$$0.38 \leq h_4 \leq 0.87 \tag{6}$$

Figure 2:
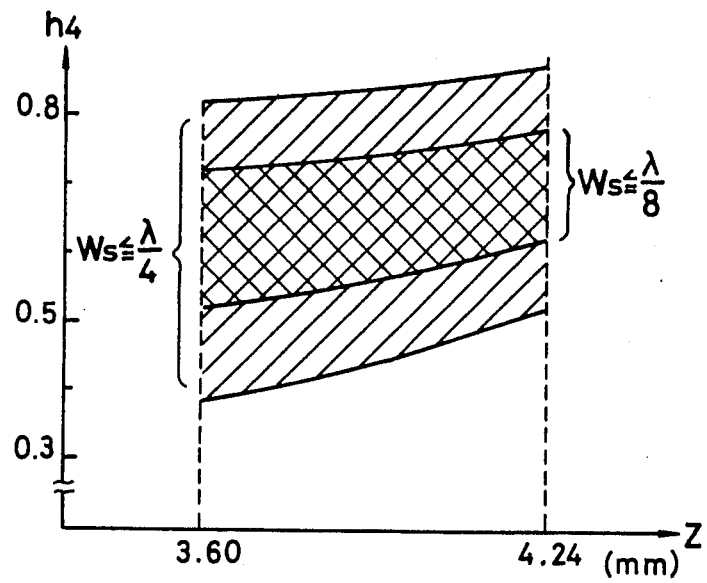
FIG. 2 is a graph showing a region of a refractive index distribution coefficient $h_4$ to make the wavefront aberration within $\lambda/8$ or $\lambda/4$.

This is a condition of a refractive index distribution coefficient $h_4$ to reduce the spherical aberration of the lens. The range is more or less dependent on the lens length Z, the central refractive index $n_o$ and the coefficient g. Assuming that $n_o=1.63$ and $g=0.2$ mm$^{-1}$, the lens length Z must be in a range of 3.6 mm$\leq Z \leq 4.24$ mm to satisfy the condition (8). Then the optimum $h_4$ is in regions enclosed between the upper and lower lines in FIG. 2. The wavefront aberration is within $\lambda/8$ in the netted region and it is within $\lambda/4$ in the hatched region (760 nm$\leq \lambda \leq$850 nm). For example, if $Z=3.6$ mm, the wavefront aberration becomes $W_s \leq \lambda/8$ in a range of $0.52 \leq h_4 \leq 0.72$. It becomes $W_s \leq \lambda/4$ in a range of $0.38 \leq h_4 \leq 0.82$.

$$|h_6| < 5 \tag{7}$$

This is a condition regarding a refractive index distribution coefficient $h_6$ to affect the spherical aberration near the outer circumference of the lens. If the condition (7) is not satisfied, the large aberration of higher degree particularly fifth degree is produced at the peripheral portion and therefore the spherical aberration becomes significantly unfavorable.

$$0.21 \leq NA \leq 0.24 \tag{8}$$

This is a condition to collimate radiated rays from a semiconductor laser efficiently into parallel rays with uniform intensity. The radiation angle of laser is usually dependent on directions but frequently becomes about 15° at smaller value. By converting the radiation angle into NA, it follows that NA~0.25 or less. If NA is too small, the efficiency is reduced. On the contrary, if NA is too large, since the radiation angle of a semiconductor laser is different in the direction of the active layer of the semiconductor and in the perpendicular direction thereto, a parallel beam with circular cross-section is not obtained but with elliptical cross-section. Consequently, NA of the lens is required to be within a range of 0.21 through 0.24.

FIG. 1 shows the function of a graded index lens for a semiconductor laser according to a preferred embodiment of the invention. In the figure, reference numeral 1 designates a rod lens made of a transparent cylindrical medium such as glass or synthetic resin. The incidence end surface 4 and the emission end surface 5 of the lens 1 are parallel planes orthogonal to the optical axis 0—0. Numeral 2 designates a semiconductor laser light source, and numeral 3 a lens diaphragm. Rays which are radiated in diffusion from the light source 2 located at a distance $f_B$ from the incidence end surface 4 of the lens 1 are collimated into parallel rays by the lens 1. After passing through the diaphragm 3 having aperture of radius $r_o$, the rays are projected to an information recording medium or the like.

Examples of values of a collimator lens of the invention are as follows:

| | Example 1 | Example 2 |
|---|---|---|
| | | (= 780 nm) |
| | $r_1 = \infty$ | $r_1 = \infty$ |
| | $r_2 = \infty$ | $r_2 = \infty$ |
| | $Z = 3.60$ mm | $Z = 4.24$ mm |
| | $2 r_0 = 2.0$ mm | $2 r_0 = 2.0$ mm |
| | $n_o = 1.63$ | $n_o = 1.63$ |
| | $g = 0.2$ mm$^{-1}$ | $g = 0.2$ mm$^{-1}$ |
| | $0.52 < h_4 < 0.72$ | $0.62 < h_4 < 0.78$ |
| | $h_6 = 0.30$ | $h_6 = 0.30$ |
| | NA = 0.21 | NA = 0.24 |
| | $f_B = 3.50$ mm | $f_B = 2.7$ mm |

-continued

| Example 1 | Example 2 |
|---|---|
| $f_B + Z = 7.10$ mm | $f_B + Z = 6.94$ mm |

Examples of glass composition which may be used for a collimator lens of the invention are as follows:

| (1) SiO$_2$ | 17 to 75 wt. % |
|---|---|
| Tl$_2$O | 2 to 80 wt. % |
| R$_2$O | 0 to 40 wt. % |
| R'O | 0 to 65 wt. % |

Where R is at least one selected from a group of Li, Na, K, Rb and Cs, and R' is at least one selected from a group of Mg, Ca, Zn, Sr, Cd, Ba and Pb.

| (2) SiO$_2$ | 35 to 80 mol % |
|---|---|
| Tl$_2$O | 4 to 26 mol % |
| ZnO | 2 to 26 mol % |
| Tl$_2$O + R$_2$O | 8 to 42 mol % |
| Na$_2$O + Li$_2$O | 4 to 26 mol % |
| ZrO$_2$ + Al$_2$O$_3$ + Sr(SnO$_2$) | 0.1 to 8 mol % |
| (Na$_2$O + Li$_2$O)/Tl$_2$O | 0.18 to 5.5 mol % |

A collimater lens of the invention may be manufactured as follows.

A glass rod is dipped in a molten salt containing potassium ions, for example, potassium nitrate for ion exchange. In this process, thallium ions and sodium ions are solved out through the surface of the glass rod into the molten salt and potassium ions are entered into the glass rod from the molten salt. By this ion exchange process, the concentration of each of thallium ions and sodium ions becomes maximum at the central axis of the rod and decrease gradually to the periphery. The concentration of potassium ions decreases gradually from the periphery to the central axis. By such ion concentration distributions, an index distribution is formed in the glass rod such that the refractive index becomes maximum at the central axis and decreases gradually in proportion to the square of the radial distance from the central axis.

In another method for making a collimator lens of glass, layers of fine glass particles (soots), the refractive indexes of which are different from one another, are deposited concentrically in order by CVD. The obtained porous cylindrical material is sinterred to form a transparent glass rod, which is drawn with heat.

In a method for making a collimator lens of synthetic resin, a transparent solid body of a network polymer which has been incompletely polymerized and contains 2 to 80 wt.% of solvent component is prepared. A monomer which forms a polymer having a refractive index different from that of the above netwark polymer is diffused into the solid body through the surface thereof. Subsequently of or simultaneously with the diffusion process, the polymerizations of the body material and the monomer diffused into the solid body are completed.

What is claimed is:

1. A collimator lens of graded index type for a semiconductor laser, comprising a rod lens of graded index type made of a cylindrical transparent medium having the refractive index n(r) at position of radial distance r from the central index represented by:

$$n^2(r) = n_o^2\{1 - (g \cdot r)^2 + h_4(g \cdot r)^4 + h_6(g \cdot r)^6 + h_8(g \cdot R)^8 + \ldots\}$$

and satisfying the following conditions:
(1) $r_1 = \infty$;
(2) $r_2 = \infty$;
(3) $6.70 \text{ mm} \leq Z + f_B \leq 7.30 \text{ mm}$;
(4) $1.60 \leq n_o \leq 1.65$;
(5) $0.18 \text{ mm}^{-1} \leq g \leq 0.22 \text{ mm}^{-1}$;
(6) $0.38 \leq h_4 \leq 0.87$;
(7) $|h_6| < 5$; and
(8) $0.21 \leq NA \leq 0.24$;

where $r_1$ and $r_2$ are curvature radii at the lens incidence surface and emission surface, respectively, $Z$ is the lens length, $f_B$ is the back focus at the side of light source (object), NA is the refractive index on the central axis, $g$, $h_4$ and $h_6$ are distribution coefficients.

* * * * *